(12) United States Patent
Parsons et al.

(10) Patent No.: US 8,280,952 B1
(45) Date of Patent: Oct. 2, 2012

(54) METHODS IMPLEMENTING A PREFERRED PLACEMENT SERVICE FOR DOMAIN REGISTRATION WEBSITES

(75) Inventors: Robert Parsons, Scottsdale, AZ (US); Barbara Rechterman, Cave Creek, AZ (US); Micheal Zimmerman, Scottsdale, AZ (US); James Bladel, Le Claire, IA (US); Richard Merdinger, Coralville, IA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 476 days.

(21) Appl. No.: 12/715,861

(22) Filed: Mar. 2, 2010

Related U.S. Application Data

(63) Continuation-in-part of application No. 12/636,394, filed on Dec. 11, 2009, and a continuation-in-part of application No. 12/636,412, filed on Dec. 11, 2009, now Pat. No. 7,890,602.

(51) Int. Cl.
*G06F 15/16* (2006.01)

(52) U.S. Cl. ........ 709/203; 709/218; 705/10; 705/14.71

(58) Field of Classification Search .................. 709/203, 709/218; 705/10, 14.71
See application file for complete search history.

(56) References Cited

U.S. PATENT DOCUMENTS

| | | | |
|---|---|---|---|
| 6,338,082 B1 | 1/2002 | Schneider | |
| 6,745,248 B1 | 6/2004 | Gardos et al. | |
| 6,901,436 B1 | 5/2005 | Schneider | |
| 6,973,505 B1 | 12/2005 | Schneider | |
| 7,188,138 B1 | 3/2007 | Schneider | |
| 7,194,552 B1 | 3/2007 | Schneider | |
| 7,238,661 B2 | 7/2007 | Glynn et al. | |
| 7,548,929 B2 | 6/2009 | Collins et al. | |
| 7,711,850 B2 * | 5/2010 | Ronen et al. | 709/239 |
| 7,711,851 B2 * | 5/2010 | Ronen et al. | 709/239 |
| 7,809,605 B2 | 10/2010 | Tonse et al. | |
| 2002/0065903 A1 | 5/2002 | Fellman | |
| 2002/0091703 A1 | 7/2002 | Bayles | |
| 2002/0091827 A1 | 7/2002 | King | |
| 2004/0068460 A1 | 4/2004 | Feeley | |
| 2004/0162916 A1 | 8/2004 | Ryan | |
| 2004/0167982 A1 | 8/2004 | Cohen | |

(Continued)

FOREIGN PATENT DOCUMENTS

WO 0110126 2/2001

OTHER PUBLICATIONS

Feb. 21, 2012 office action in related U.S. Appl. No. 12/715,810.

(Continued)

*Primary Examiner* — Firmin Backer
*Assistant Examiner* — Jonathan Bui
(74) *Attorney, Agent, or Firm* — Karl A. Fazio

(57) ABSTRACT

Methods of the present inventions allow for providing a preferred domain position on a registration website. An exemplary method may comprise receiving a request from a registrar, which may comprise a bid that the registrar had previously received from a registry seeking a preferred placement on a domain registration website for a domain administered by the registry. The method may further comprise generating a quality score for the domain, determining (based upon the bid and the quality score) a preferred placement for the domain, and transmitting the preferred placement to the registrar.

52 Claims, 15 Drawing Sheets

U.S. PATENT DOCUMENTS

| | | |
|---|---|---|
| 2004/0199493 A1 | 10/2004 | Ruiz |
| 2004/0199608 A1 | 10/2004 | Rechterman |
| 2005/0021588 A1 | 1/2005 | Zimmerman |
| 2005/0102354 A1 | 5/2005 | Hollenbeck |
| 2005/0114484 A1 | 5/2005 | Wilson |
| 2005/0223000 A1 | 10/2005 | Davis et al. |
| 2006/0161682 A1 | 7/2006 | King |
| 2006/0271668 A1 | 11/2006 | Parsons |
| 2007/0174124 A1 | 7/2007 | Zagofsky et al. |
| 2008/0097834 A1 | 4/2008 | McElfresh et al. |
| 2009/0254545 A1 | 10/2009 | Fisken |
| 2010/0058210 A1* | 3/2010 | Johnson .................. 715/764 |
| 2010/0223141 A1 | 9/2010 | Spencer et al. |
| 2010/0274668 A1 | 10/2010 | Langston et al. |
| 2011/0087769 A1 | 4/2011 | Holmes et al. |

OTHER PUBLICATIONS

Feb. 21, 2012 response to Feb. 21, 2012 office action in related U.S. Appl. No. 12/715,810.

May. 3, 2012 Notice of Allowance in related U.S. Appl. No. 12/715,810.

Dec. 28, 2010 Notice of Allowance in related U.S. Appl. No. 12/636,412.

Mar. 19, 2012 Notice of Allowance in related U.S. Appl. No. 12/715,831.

Apr. 13, 2012 Notice of Allowance in related U.S. Appl. No. 12/715,810.

Google Adsense for content: Enhance your site—and your products, Feb 5, 2009, pp. 1-2.

* cited by examiner

METHODS IMPLEMENTING A PREFERRED PLACEMENT SERVICE FOR DOMAIN REGISTRATION WEBSITES

CROSS REFERENCE TO RELATED PATENT APPLICATIONS

This patent application is a continuation-in-part of the following previously-filed patent applications, each of which are also assigned to Go Daddy Operating Company, LLC, priority from which is hereby claimed:

U.S. patent application Ser. No. 12/636,394 to Parsons et al., with filing date Dec. 11, 2009 and entitled "METHODS FOR DETERMINING PREFERRED DOMAIN POSITIONING ON A REGISTRATION WEBSITE;" and U.S. patent application Ser. No. 12/636,412 to Parsons et al., with filing date Dec. 11, 2009 and entitled "TOOLS ENABLING PREFERRED DOMAIN POSITIONING ON A REGISTRATION WEBSITE."

This patent application also is related to the following concurrently-filed patent applications, each of which are also assigned to Go Daddy Operating Company, LLC:

U.S. patent application Ser. No. 12/715,810 entitled: "A PREFERRED PLACEMENT SERVICE FOR DOMAIN REGISTRATION WEBSITES;" and U.S. patent application Ser. No. 12/636,412 entitled: "TOOLS ENABLING A PREFERRED PLACEMENT SERVICE FOR DOMAIN REGISTRATION WEBSITES."

FIELD OF THE INVENTION

The present inventions generally relate to domain registration and, more particularly, methods and tools for determining and enabling preferred domain positioning on a registration website.

SUMMARY OF THE INVENTION

An example embodiment of a method for determining preferred domain positioning on a registration website may comprise the steps of receiving a bid from a registry seeking such preferred placement for a domain that may be administered by the registry, generating a quality score for the domain, and determining the preferred placement based upon the bid and the quality score.

An example embodiment of a tool for enabling preferred domain positioning on a registration website may comprise a computer-readable media storing instructions that, when executed by a server computer, cause the server to receive a bid from a registry seeking such preferred placement for a domain (that may be administered by the registry), generate a quality score for the domain, and determine the preferred placement based upon the bid and the quality score.

The above features and advantages of the present inventions will be better understood from the following detailed description taken in conjunction with the accompanying drawings.

DETAILED DESCRIPTION

Figure 1:
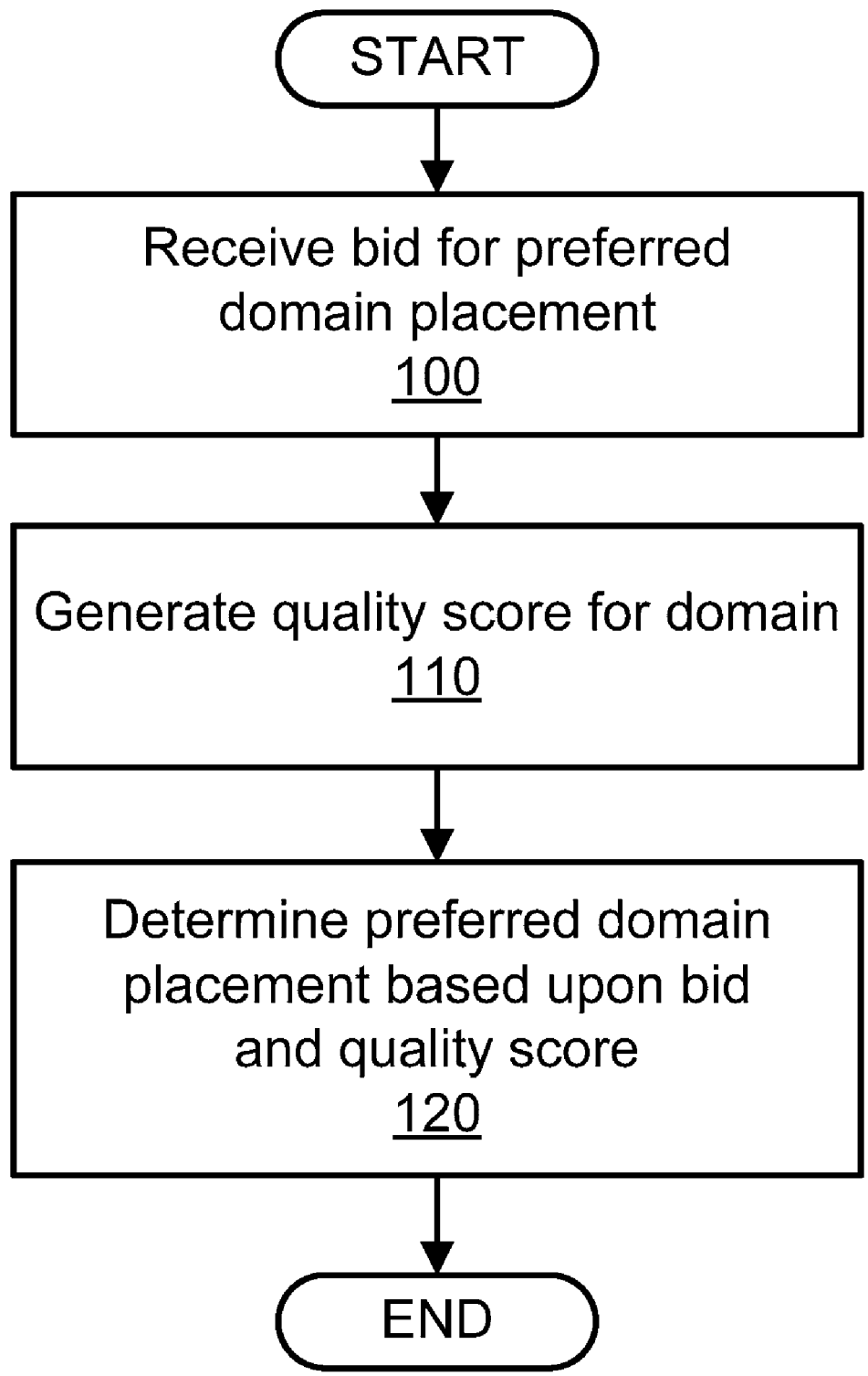
FIG. 1 is a flow diagram illustrating a possible embodiment of a method for determining preferred domain positioning on a registration website.

The present inventions will now be discussed in detail with regard to the attached drawing figures which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other. Prevalent on the Web are multimedia websites, some of which may offer and sell goods and services to individuals and organizations. Websites may consist of a single webpage, but typically consist of multiple interconnected and related webpages. Menus and links may be used to move between different webpages within the website or to move to a different website as is known in the art. The interconnectivity of webpages enabled by the Internet can make it difficult for Internet users to tell where one website ends and another begins. Websites may be created using HyperText Markup Language (HTML) to generate a standard set of tags that define how the webpages for the website are to be displayed.

Websites, unless extremely large and complex or have unusual traffic demands, typically reside on a single server and are prepared and maintained by a single individual or entity. Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

The domain name system (DNS) is the world's largest distributed computing system that enables access to any resource on the Internet by translating user-friendly domains to IP addresses. The process of translating domains to IP addresses is known as Name Resolution. A DNS name resolution is the first step in the majority of Internet transactions. The DNS is a client-server system that provides this name resolution service through a family of servers called Domain Name Servers. The hierarchical domain space is divided into administrative units called zones. A zone usually consists of a domain (e.g., example.com) and possibly one or more sub-domains (e.g., projects.example.com, services.example.com). The authoritative data needed for performing the name resolution service is contained in a file called the zone file and the DNS servers hosting this file are called the authoritative name servers for that zone. The DNS clients that make use of the services provided by authoritative name servers may be of two types. One type is called a stub resolver that formulates and sends a query every time it receives a request from an application that requires Internet service (e.g., a browser). The other type is called a caching (also called recursive/resolving) name server that caches the name resolution responses it has obtained from the authoritative name servers and is thus able to serve multiple stub resolvers.

The zone file hosted on an authoritative name server consists of various types of records called Resource Records (RRs). A type (RRtype) is associated with each DNS resource record. The code for these RRtypes is assigned by an international organization called Internet Assigned Names Authority (IANA). An RR of a given RRtype in a zone file provides a specific type of information. Some of the common RRtype codes are: NS, MX, CNAME, and A. An NS RR in a zone file gives the fully qualified domain name (FQDN) of the host that is considered the name server for that zone. For example, an NS RR in the zone file of the zone example.com may give the information that the host ns1.projects.example.com is a name server for the domain projects.example.com. Similarly an MX RR gives the host name for a mail server for the zone. An A RR gives the IP address for a host in a domain within the zone. CNAME provides "canonical name" records and mapping of names in the zone file. A zone file generally consists of multiple RRs of a given RRtype with some exceptions (e.g., there only can be SOA RR in a zone file). It can also have multiple RRs for the same domain and same (or different) RRtype (e.g., multiple name servers or mail servers for a domain services.example.com).

The DNS infrastructure consists of many different types of DNS servers, DNS clients, and transactions between these entities. An important transaction in DNS is the one that provides the core service of DNS (i.e., name resolution service) and is called the DNS Query/Response. A DNS Query/Response transaction is made up of a query originating from a DNS client (generically called a DNS resolver) and response from a DNS name server. The response consists of one or more RRs. These RRs may be served from its own zone file (for an authoritative name server) or from a cache of RRs obtained from other name servers (for a caching/resolving/recursive name servers). In this way, the DNS serves as a global, distributed database. Name servers (serving zone files) each contain a small portion of the global domain space, and clients issue queries using a domain and a desired RRtype.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain. An example of a URL with a HTTP request and domain is:

http://www.companyname.com. In this example, the "http" identifies the URL as a HTTP request and the "companyname.com" is the domain.

Domains are much easier to remember and use than their corresponding IP addresses. The Internet Corporation for Assigned Names and Numbers (ICANN) approves some Generic Top-Level Domains (gTLD) and delegates the administrative responsibility to a particular organization (a "registry") for maintaining an authoritative source for the registered domains within a TLD and their corresponding IP addresses. Such a registry may comprise any registry or other entity under contract (or other agreement) with ICANN to administer one or more TLDs, a registry operator that may comprise any entity sub-contracted with the registry to administer the TLD on behalf of the registry and make the TLD available to registrars for registration, and/or any agent operating on behalf of a registry to carry out the registries' contractual obligations with ICANN. For certain TLDs (e.g., .biz, .info, .name, and .org) the registry is also the authoritative source for contact information related to the domain and is referred to as a "thick" registry. For other TLDs (e.g., .com and .net) only the domain, registrar identification, and name server information is stored within the registry, and a registrar is the authoritative source for the contact information related to the domain. Such registries are referred to as "thin" registries. Most gTLDs are organized through a central domain Shared Registration System (SRS) based on their TLD.

The process for registering a domain with .com, .net, .org, or other TLDs allows an Internet user to use an ICANN-accredited registrar to register their domain. For example, if an Internet user, John Doe, wishes to register the domain "mycompany.com," John Doe may initially determine whether the desired domain is available by contacting a domain registrar. The Internet user may make this contact using the registrar's website and typing the desired domain into a field on the registrar's webpage created for this purpose.

Upon receiving the request from the Internet user, the registrar may ascertain whether "mycompany.com" has already been registered by checking the SRS database associated with the TLD of the domain. The results of the search then may be displayed on the registrar's website to thereby notify the Internet user of the availability of the domain. If the domain is available, the Internet user may proceed with the registration process. If the domain is not available for registration, the Internet user may keep selecting alternative domains until an available domain is found. When a domain is registered, the registrar may pay a registration fee to the registry responsible for administering the TLD used by the registered domain. Continuing with the previous paragraph's example, upon registration of the domain "mycompany.com," although the registrar may have collected a fee from the domain registrant, it also may have paid the registry the appropriate registration fee for the allocated .com TLD.

Currently, there are substantially more domain registrars than domain registries. Because of recent rule changes promulgated by ICANN, however, Applicant anticipates growth in the number of TLDs available for domain registration. In summary, ICANN has approved an expansion of the TLD scheme. For example, rather than being limited to a few TLDs that supposedly relate the purpose of the domain (e.g., .com for companies, .org for non-profit organizations, .gov for governmental entities, .edu for educational institutions, etc.), Internet users (who have the proper infrastructure and financial backing to become ICANN-approved) may apply to become the registry for their own TLDs. For example, the city of Scottsdale, Ariz. could operate the .scottsdale TLD and The Go Daddy Group, Inc. could operate the .godaddy TLD.

Under this emerging scheme, TLD registries will need to compete for registrars to offer their TLDs for registration on their domain registration websites. Such TLD registries also will need to compete for preferred placement of their domains on the registrars' domain registration websites. Applicant has determined that presently-existing systems and methods do not provide optimal means for determining and enabling preferred domain positioning on such registrars' registration websites. For these reasons, there is a need for the systems and methods (and related functionality) as described herein.

Methods for Determining Preferred Domain Positioning on a Registration Website

Figure 2:
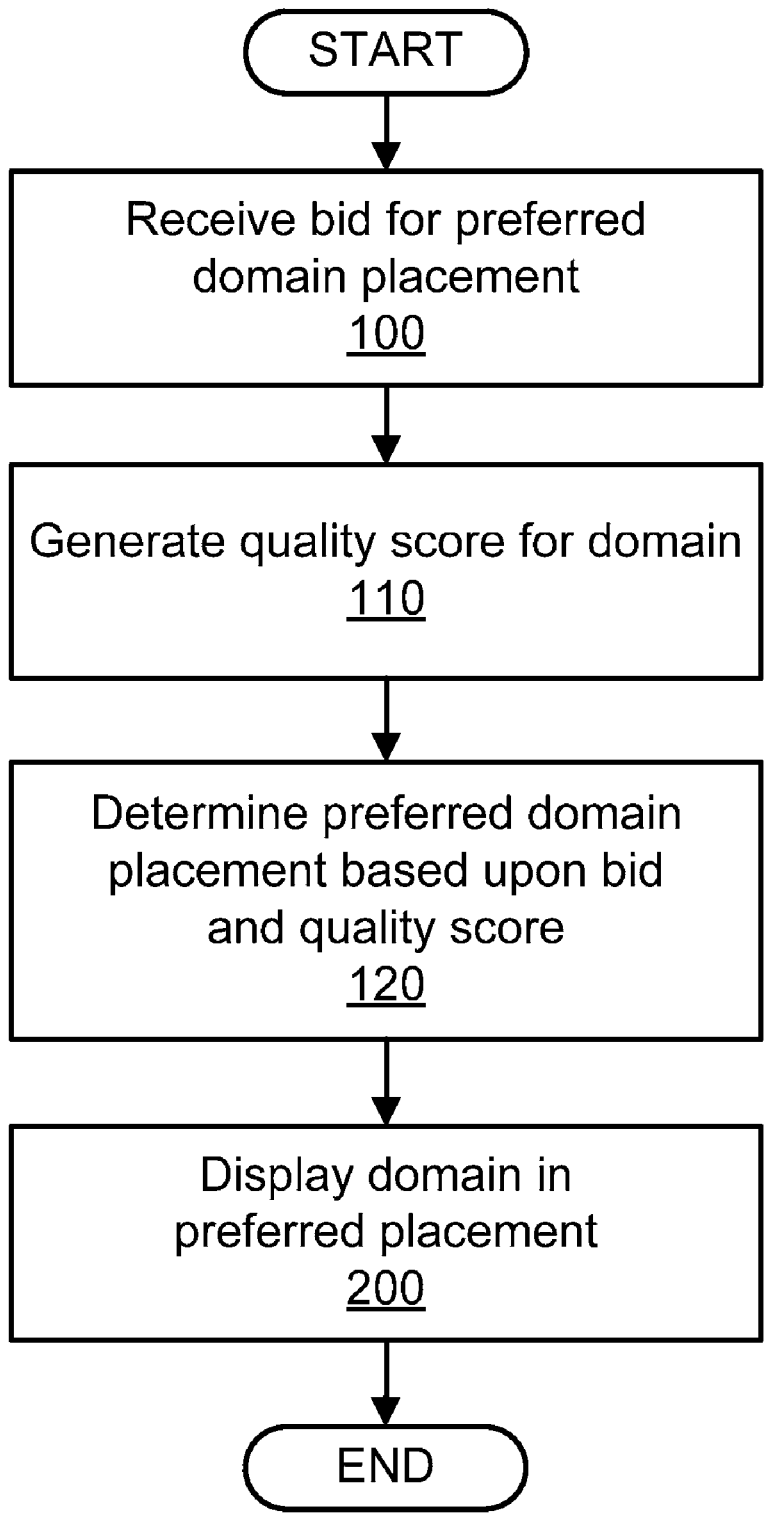
FIG. 2 is a flow diagram illustrating a possible embodiment of a method for determining preferred domain positioning on a registration website.

FIG. 1 illustrates an embodiment of a method for determining preferred domain positioning on a registration website that may, as a non-limiting example, be performed by at least one microprocessor on at least one server computer communicatively coupled to a network and executing a plurality of instructions stored on at least one computer-readable media. The method may comprise the steps of receiving a bid from a registry seeking a preferred placement on a domain registration website for a domain administered by the registry (Step 100), generating a quality score for the domain (Step 110), and determining the preferred placement based upon the bid and the quality score (Step 120). As illustrated in FIG. 2, the method may further comprise displaying the domain on the domain registration website in the preferred placement.

As a non-limiting example, the methods illustrated in FIGS. 1 and 2 (and all methods described herein) may be performed by any central processing unit (CPU) in any computing system, such as a microprocessor running on a server computer, and executing instructions stored (perhaps as scripts and/or software) in computer-readable media accessible to the CPU, such as a hard disk drive on a server computer. Such a server computer may be communicatively coupled to a network (e.g., the Internet) and may receive a bid from a registry seeking a preferred placement on a domain registration website for a domain administered by the registry (Step 100). The domain registration website may comprise any website-enabled domain purchase and/or registration system, such as that described in detail above and/or may be available on GODADDY.COM's website and may be operated by any entity offering domains for registration including, but not limited to, a domain registry, a domain registrar, or a domain reseller. A domain name reseller may comprise any third party under agreement with a registrar for the purpose of reselling the registrar's products and/or services.

The bid may come from any individual or entity desiring to have a domain offered for registration on a domain registration website (e.g., a domain registry, a domain registrar, or a domain reseller). As a non-limiting example, a bidding registry may provide domain registry services, domain registrar services, or both. The bid may comprise any electronic communication or combination of data, perhaps received by a server computer, that seeks preferred placement on a domain registration website including, but not limited to, a Hyper Text Transfer Protocol (HTTP) request, email message, Short Message Service (SMS) message (i.e., text message), or (as described with respect to FIG. 9 below) a function call on an Application Programming Interface (API) running on a server computer.

Alternatively, the bid may be received via other means, such as via a written, typewritten, faxed, or mailed document, or via oral communication. Irrespective of the format in which the bid is received, it may comprise, as non-limiting examples, the domain to be listed on the domain registration website, the requested preferred placement on the domain registration website, the bidder's contact information (e.g., registry name, address, phone number, IP address, email address, etc.) and/or an offer to pay a remuneration for the requested preferred placement. The remuneration offered, suggested, paid, or agreed to be paid in exchange for the requested preferred domain placement may comprise any compensation including, but not limited to, financial compensation. Such financial compensation may be paid on a cost-per-click (e.g., a price paid for each click on the domain listed on the domain registration website), cost-per-impression (e.g., a price paid for each appearance of the domain on the domain registration website), cost-per-acquisition (e.g., a price paid for each domain registration via the domain registration website), flat fee (e.g., a one-time payment), or recurring fee (e.g., monthly or annual) basis.

The illustrated embodiments place no limitation on the format that a domain may take. As non-limiting examples, the domain may comprise a top-level domain (TLD), a generic top-level domain (gTLD), a country code top-level domain (ccTLD), a second-level domain, a premium domain, and/or a suggested domain. A TLD is a domain at the highest level of the DNS. Such TLDs are installed in the root zone of the name space. For lower level domains, the TLD may comprise the last part of the domain (i.e., the phrase following the last dot of the full domain). For example, in www.example.com, the term ".com." is the TLD. A gTLD is a specific category of TLDs maintained by ICANN for use in the DNS that may, as a non-limiting example, include the following TLDs: .aero, .asia, .biz, .cat, .com, .coop, .info, .jobs, .mobi, .museum, .name, .net, .org, .pro, .tel, and/or .travel. ccTLDs may comprise TLDs reserved for use by countries, sovereign states, or a dependent territory (e.g., .us, .de, .tv, .me). A second-level domain may comprise a root name concatenated to a top-level domain administered by a registry. Thus, it may be a domain that is directly below a TLD in the DNS hierarchy. Continuing with the previous example, in www.example.com, the term "example.com" is the second-level domain of the .com TLD. The domain also may comprise any subdomain of a larger domain. Thus, first.example.com and second.example.com are both subdomains of the example.com second-level domain.

A premium domain may comprise any of the above-described domains that may have a market value that is higher than the standard domain registration fee. Such higher market value may result from the premium domain incorporating words commonly searched in search engines, and/or keywords that may cause the premium domain to have a higher ranking on search engines. Premium domains also may have gone through an appraisal to establish their market value. A suggested domain may comprise any domain generated (perhaps by software and/or scripts running on a server computer in response to a customer request) and presented to a customer for registration. Future iterations of the DNS may establish alternate domain formats (perhaps using different alphanumeric structures, latin or non-latin character sets or alphabets, or other scripts in human and/or machine-readable languages (e.g., bar code, IBN, UBC, and/or RFID), or other file types (e.g., image, audio, or video files)) functioning as a domain or a similarly-functioning resource locator, which are explicitly contemplated by this patent application.

Figure 3:
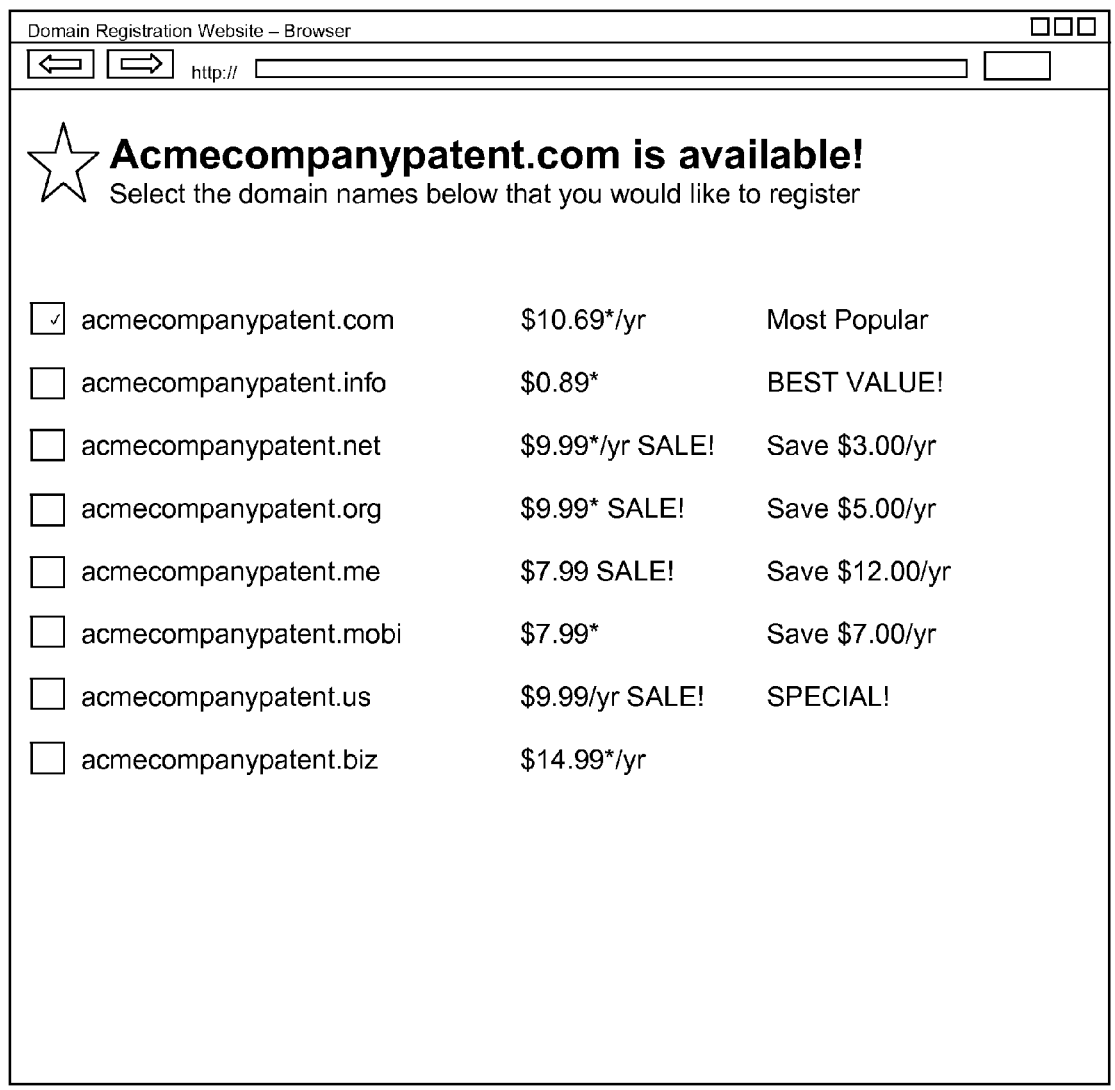
FIG. 3 illustrates a domain registration website.

As described above, the bid received from a registry (Step 100) may be part of a request seeking a preferred placement on a domain registration website for a domain administered by said registry. The preferred placement may comprise any location on the domain registration website that may be more likely to attract the attention of a user than an other location. The preferred placement location, as non-limiting examples, may be determined by human factors, usability, or similar studies, or may be a simple arbitrary or intuitive choice. As illustrated in FIG. 3, it also may comprise a preferred placement within a vertical arrangement of a plurality of domains, perhaps at the top of a list of a plurality of domains, or simply a higher placement within such a list than the placement of other domains. The preferred placement may therefore, as non-limiting examples, comprise a top-most, bottom-most, or more centered position in any such vertical list.

Figure 4:
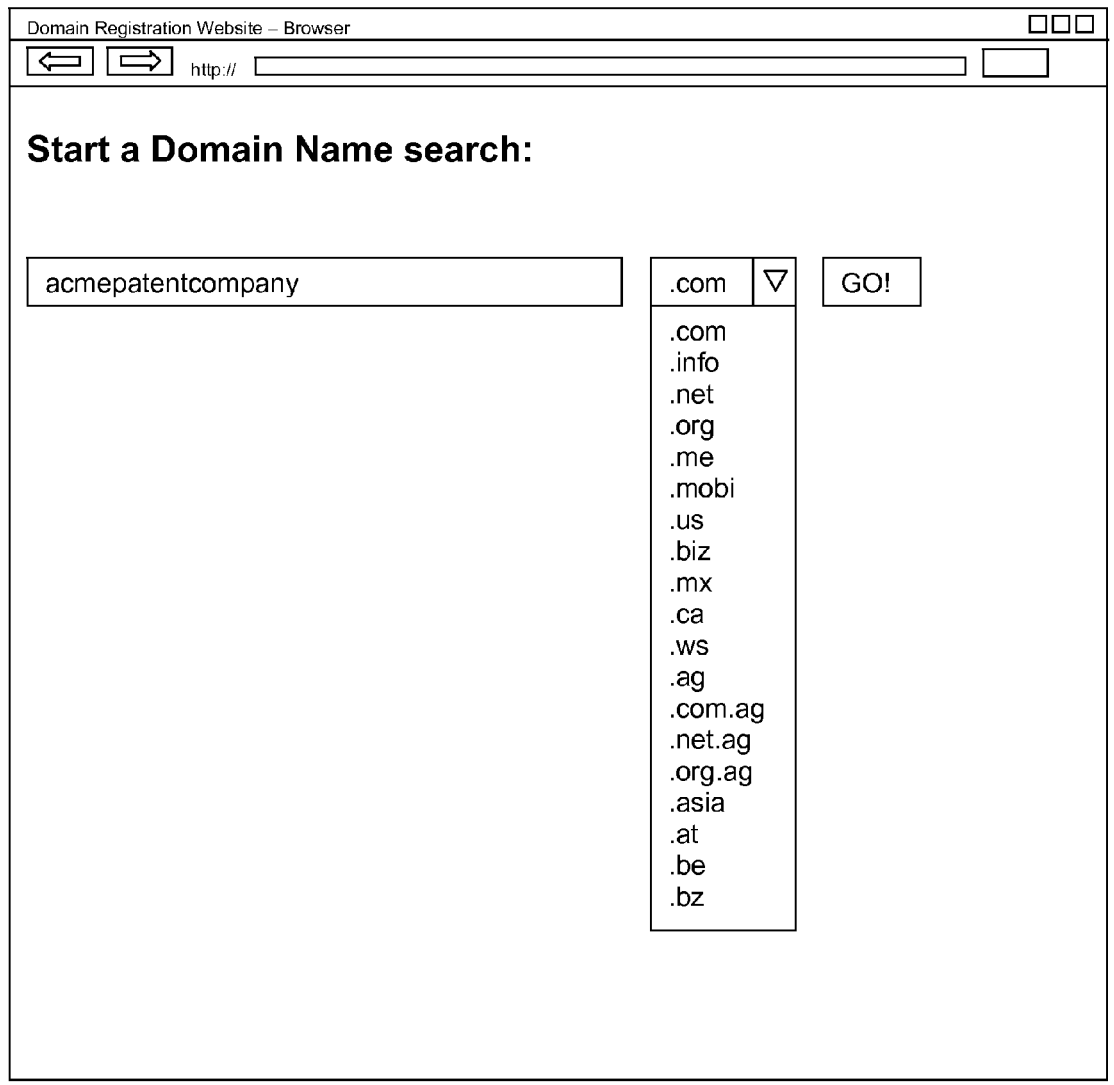
FIG. 4 illustrates a domain registration website.

As can be seen in FIG. 3, the domain containing the .com TLD is at the top of the vertical list, which may be a preferred placement. Similarly, the domain containing the .info TLD has a preferred (i.e., higher) placement than the domain containing the .net TLD. This concept may also apply to a horizontal arrangement of domains, wherein perhaps the preferred placement comprises a left-most, right-most, or more centered position. FIG. 4 illustrates that such preferred placement concepts may be applied within a drop-down box on a domain registration website. In FIG. 4, the .com TLD is at the top of the vertical list within the drop-down, which may be a preferred placement. Similarly, the .info TLD has a preferred (i.e., higher) placement than the .net TLD.

Irrespective of the domain presentation mode on the registration website (e.g., vertical list, horizontal list, drop-down box, etc.), the plurality of domains amongst which a subject domain may be granted preferred placement need not comprise an exhaustive list of domains available for registration. Thus, as a non-limiting example, perhaps only those domains with a bid, quality score, and/or some combination thereof that exceed a predetermined value may be listed for registration on the domain registration website, with domains having better bids, quality scores, and/or some combination thereof receiving preferred placements in relation to other domains. Those domains with a bid, quality score, and/or some combination thereof that does not exceed the predetermined value may, perhaps, not appear on the registration website.

Returning to FIG. 2, the method further may comprise the step of generating, perhaps by software and/or scripts running on at least one server computer communicatively coupled to a network, a quality score for the domain (Step 110). The quality score may comprise any metric (e.g., the result of a quantitative or qualitative analysis, an alphanumeric score, a star-rating system, etc.) that indicates the relative value of a subject domain when compared to a plurality of other domains. As a non-limiting example, the quality score may be a function of a price, a performance, a market share, and/or a customer desirability of the domain.

Thus, variables that may factor into the quality score may comprise, as a non-exclusive list: (1) domain Zone File availability; (2) registry-registrar connection quality; (3) quality of registry customer or technical support provided to registrars; (4) the existence of domain registration requirements implemented by the registry that may limit the pool of available domain registrants; (5) costs and fees charged to the registrar by the registry for domain registration (for both new and renewal registrations); (6) projected domain growth in market; (7) the domain's percentage of new domain registrations; (8) the number of domains registered at a specific registrar that include the subject domain; (9) WHOIS data availability and quality (i.e., contact data integrity and validity); (10) domain registry thickness (i.e., is the domain administered by a thick or thin registry?); (11) frequency in which domains comprising the subject TLD are the subject of availability checks; (12) overall domain registry reliability and availability (e.g., uptime, command execution success/failure, and domain registration refund percentages); (13) domain registration period in years supported at the registry; (14) domain renewal rate; and (15) domain transfer support and ease (i.e., does the registry support simple, automated domain transfers? Or is it difficult to move domains between registrars?).

Alternatively, the quality score could comprise a single variable, such as the total volume (i.e., number) of domain registrations, perhaps, the number of domains registered by a domain registrar within a 30-day period. The quality score could also comprise a number of domain registration years (DRYs) or a number of DRYs registered by a domain registrar within a 30-day period. A DRY may comprise a domain multiplied by the number of years for which it is registered. For example, a domain registered for 5 years would comprise 5 DRYs. Three domains registered for 3-year terms each would comprise 9 DRYs.

The preferred placement may then be determined (perhaps by software and/or scripts running on at least one server), which may be based upon the bid and/or the quality score (Step 120). As described in detail above, the preferred placement may comprise any location on the domain registration website that may be more likely to attract the attention of a user than an other location. As a non-limiting example, the preferred placement may be determined by a mathematical function that calculates a score based upon the dollar value of a bid and the numerical value of a quality score. A better (e.g., higher) score may result in a better (e.g., more optimal) placement on a domain registration website.

Figure 5:
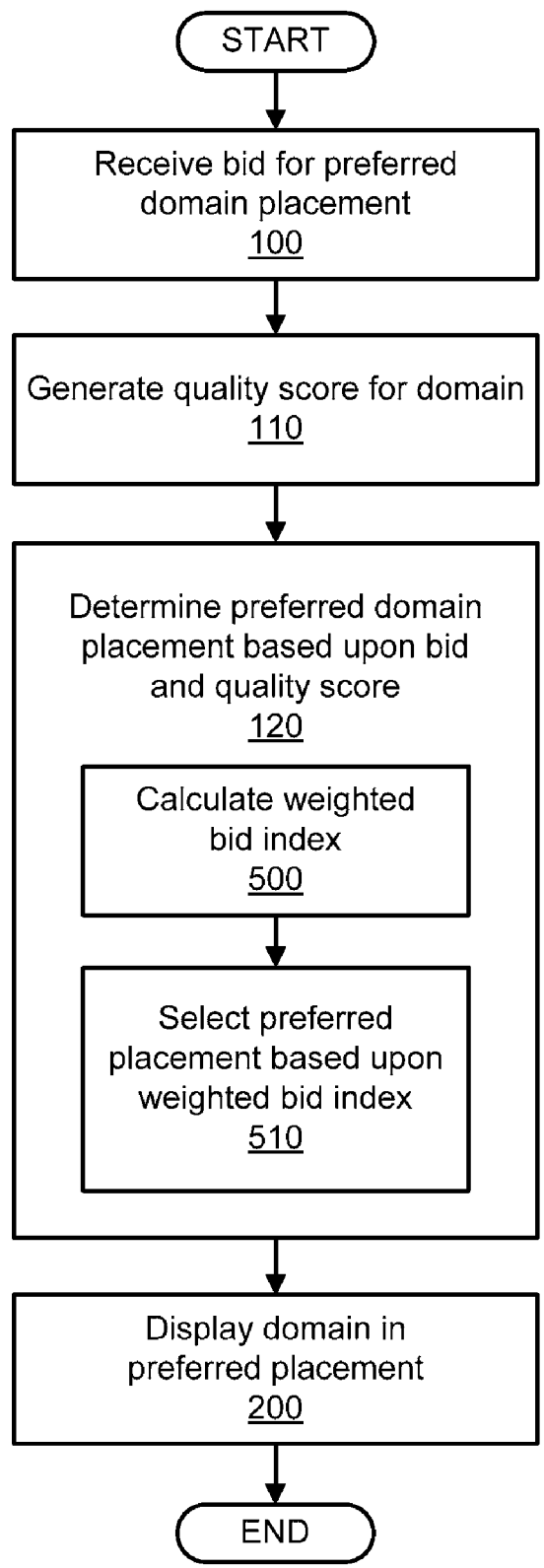
FIG. 5 is a flow diagram illustrating a possible embodiment of a method for determining preferred domain positioning on a registration website.

FIG. 5 illustrates an embodiment of a method for determining preferred domain positioning on a registration website, wherein the determining step C) further comprises calculating a weighted bid index for the domain (which may be a function of the bid and the quality score) (Step 500), and selecting the preferred placement based upon the weighted bid index (Step 510). The weighted bid index may be calculated by any algorithm or mathematical function using both the bid received in step 100 and the quality index generated in Step 110. The weighted bid index may, by combining these variables, generate an index upon which the domain's preferred placement on a website may be located.

As a non-limiting example, the weighted bid index may be calculated according to the following formula: weighted bid index=(volume of domain registrations registered by a domain registrar within a 30-day period)*(financial value of the bid+predetermined financial credit). Using the .com TLD for example, if Registrar A registered 1000 .com domains in the past 30 days, the .com Registry bid $100 for Registry A to offer .com domains on its registration website, and Registy A used a predetermined credit of $1, the weighted bid index would be: (1000)*(100+1), or 101,000. TLDs with higher weighted bid indices would obtain better preferred placement on the website, while TLDs with lesser weighted bid indices would obtain less preferential placement.

The domain may then be displayed in the preferred placement (Step 200) on the domain registration website (perhaps by software and or scripts running on at least one server) for registration. Domain registration may be accomplished by any domain registration method known in the art or developed in the future, perhaps via a website-enabled domain purchase and registration system, such as that described in detail above and/or may be available on GODADDY.COM's website. Alternatively, domain registration may be accomplished via human to human communication, perhaps via a telephone call or in-person meeting. Domains may be registered by, as non-limiting examples, any individual or entity including, but not limited to a domain registry, domain registrar, hosting provider, and/or software application developer or distributor.

Domain registration availability may be determined at any point in the methods described herein, perhaps by software and/or scripts running on at least one server that may ascertain whether the domain has already been registered by checking the SRS database associated with the domain. As an additional non-limiting example, any of the systems and/or methods may be used as described in U.S. Patent Application Publication No. 2004-0199520 entitled: "Method for Checking the Availability of a Domain Name," which is assigned to The Go Daddy Group, Inc. and incorporated herein by reference. Alternatively, any method of determining domain registration availability known in the art or developed in the future may be used.

Figure 6:
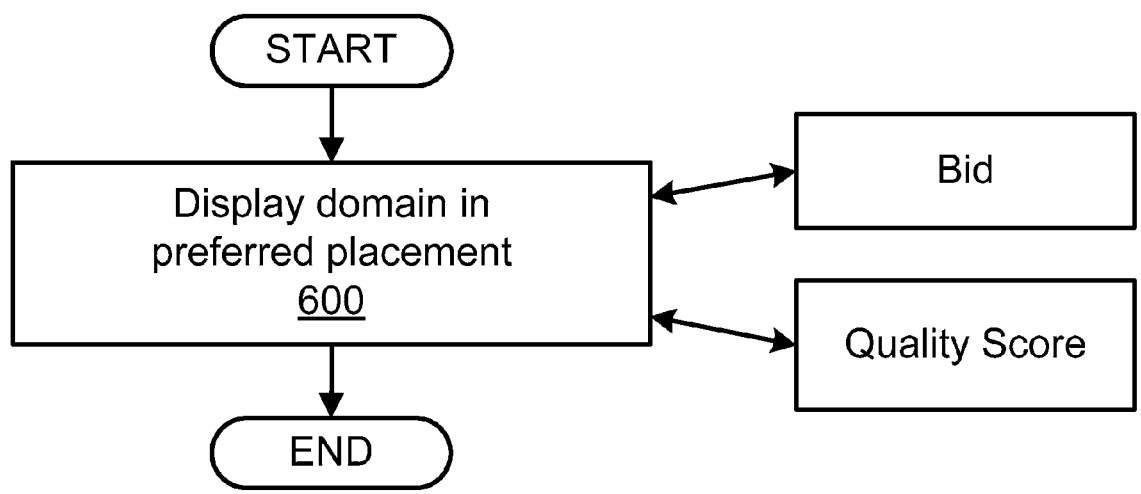
FIG. 6 is a flow diagram illustrating a possible embodiment of a method for determining preferred domain positioning on a registration website.
Figure 7:
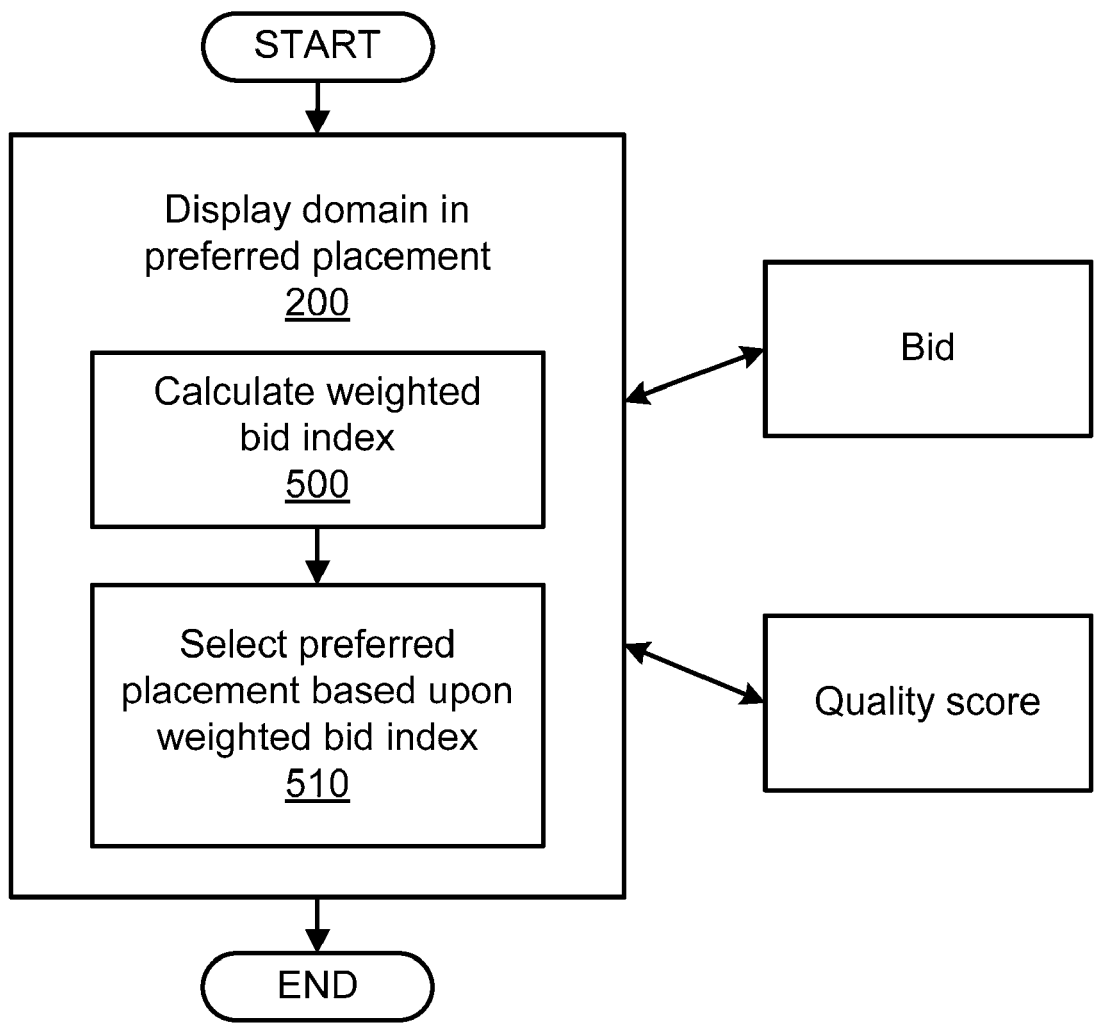
FIG. 7 is a flow diagram illustrating a possible embodiment of a method for determining preferred domain positioning on a registration website.

FIG. 6 illustrates a streamlined embodiment of a method for determining preferred domain positioning on a registration website that comprises the step of displaying, by at least one server computer communicatively coupled to a network, a domain administered by a registry in a preferred placement on a domain registration website, wherein the preferred placement may be based upon a bid from a registry that may be seeking the preferred placement and a quality score for the domain (Step 600). This step may be accomplished, perhaps by servers and/or scripts running on at least one server computer, by displaying a domain in a preferred placement on the domain registration website (Step 200), wherein the preferred placement is ascertained as described in Step 600, or perhaps by implementing Steps 100, 110, 120, 500, 510, and/or any combination thereof. FIG. 7 illustrates a specific embodiment wherein the displaying step further comprises calculating a weighted bid index for the domain (which may be a function of the bid and the quality score) (Step 500), and selecting the preferred placement based upon the weighted bid index (Step 510), as described in detail above.

Tools for Enabling Preferred Domain Positioning on a Registration Website

A tool enabling preferred domain positioning on a registration website may comprise computer-readable media 880 comprising a plurality of instructions 890 that, when executed by at least one server computer 860, may cause the server computer 860 (perhaps via its central processing unit(s) 870) to receive a bid from a registry 800 seeking a preferred placement on a domain registration website 830 for a domain administered by the registry 800 (Step 100), generate a quality score for the domain (Step 110), and determine the preferred placement based upon the bid and the quality score (Step 120). The instructions 890 on the computer-readable media 860 may further cause the server computer 860 to display the domain on the domain registration website 830 in the preferred placement (Step 200).

The computer-readable media 880 may comprise any data storage medium capable of storing instructions for execution by a computing device. It may comprise, as non-limiting examples, magnetic, optical, semiconductor, paper, or any other data storage media, a database or other network storage device, hard disk drives, portable disks, CD-ROM, DVD, RAM, ROM, flash memory, and/or holographic data storage. The instructions 890 may, as non-limiting examples, comprise software and/or scripts stored in the computer-readable media 880 that may be stored locally in a server computer 860 or client computer 820 or, alternatively, may be stored in a highly-distributed format in a plurality of computer-readable media 880 accessible via the network, perhaps via a grid or cloud-computing environment.

Figure 8:
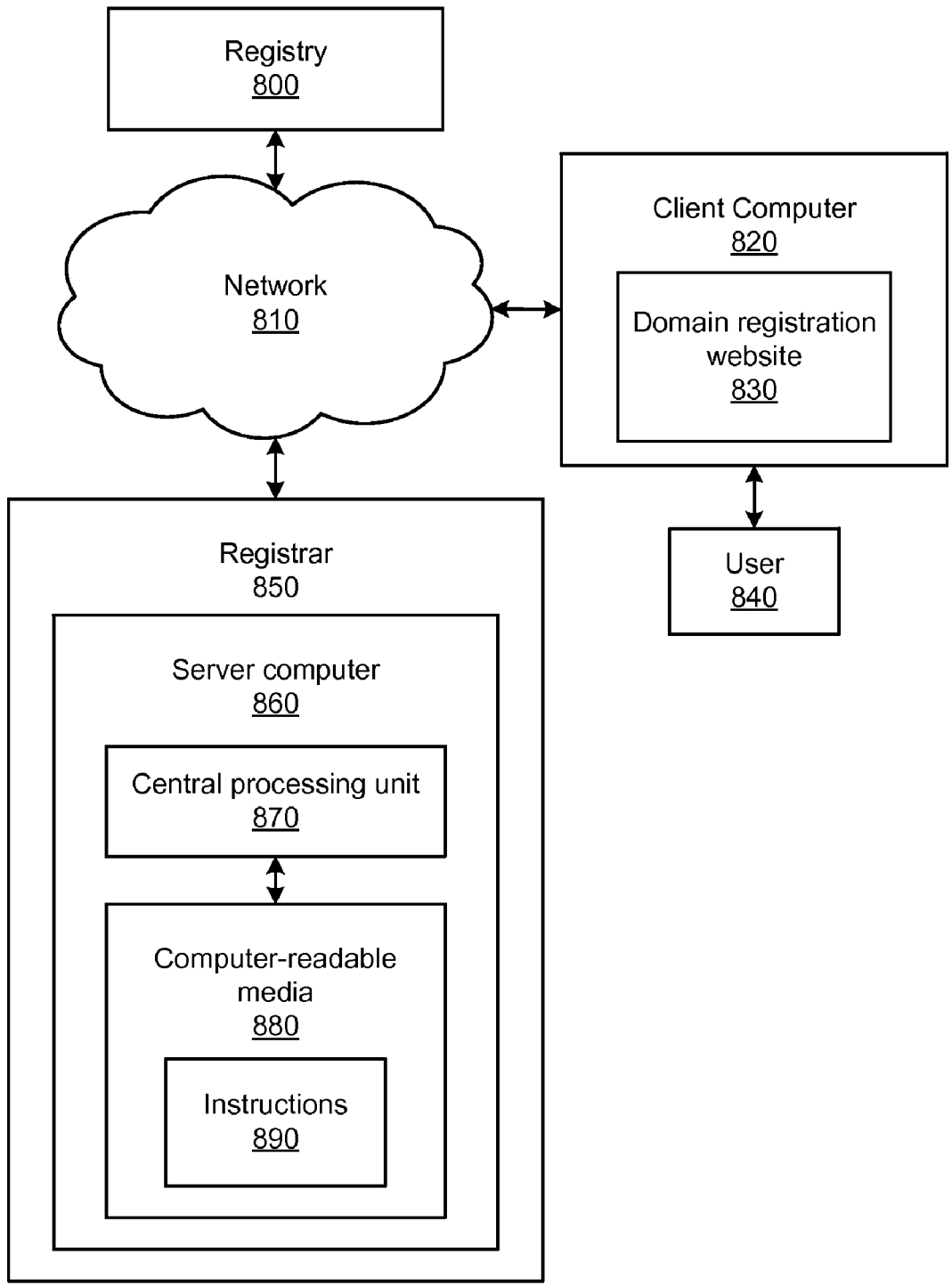
FIG. 8 illustrates a possible embodiment of tools that may be used to enable preferred domain positioning on a registration website.

FIG. 8 illustrates a computing environment in which the described computer-readable media 880 may operate. The illustrated embodiment shows a network 810 communicatively coupling a registry 800, registrar 850, and a client computer 820, through which a user 840 may access a domain registration website 830. The registrar 850 may operate at least one server computer 860, each of which may comprise a central processing unit (CPU) 870 and the computer-readable media 880. The domain registration website 830 accessible via the client computer 820 may be hosted on at least one of the registrar's 850 server computer 860.

The example embodiments herein place no limitation on network 810 configuration or connectivity. Thus, as non-limiting examples, the network 810 could comprise the Internet, the public switched telephone network, the global Telex network, computer networks (e.g., an intranet, an extranet, a local-area network, or a wide-area network), wired networks, wireless networks, or any combination thereof. Examples of client computers 820 that may be used may include a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture.

Server computers 860 and client computers 820 may be communicatively coupled to the network 810 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The domain registration website 830 may comprise any collection of data and/or files accessible, perhaps via a client computer 820 or server computer 860 communicatively coupled to the network 810. The at least one server computer 860 and/or any other server described herein, could be any computer or program that provides services to other computers, programs, or users either in the same computer or over a computer network. As non-limiting examples, the at least one server computer 860 may comprise an application, communication, mail, database, proxy, fax, file, media, web, peer-to-peer, or standalone server and may use any server format known in the art or developed in the future (possibly a shared hosting server, a virtual dedicated hosting server, a dedicated hosting server, or any combination thereof).

Another tool enabling preferred domain positioning on a registration website may comprise an application programming interface (API) 900 running on at least one server computer 860 communicatively coupled to a network 810. The API 900 may comprise computer-readable code that, when executed by at least one server computer 860, causes the API 900 to receive from a registry 800 a procedure call (i.e., function call) comprising a bid seeking a preferred placement on a domain registration website 830 for a domain administered by the registry 800. Responsive to receipt of the procedure call, the API may display the domain in the preferred placement on the website 830. As described in detail above, the preferred placement may be based upon the bid and a quality score for the domain.

The API 900 may comprise a software-to-software interface that specifies the protocol defining how independent computer programs interact or communicate with each other. The API 900 may allow the bidding party's (e.g., the registry's 800) software to communicate and interact with the described inventions—perhaps over the network 810—through a series of function calls (requests for services). It may comprise an interface running on a server computer 860 that supports function calls made of the described inventions by other computer programs, perhaps those utilized by a registry 800 seeking preferred domain placement on a domain registration website 830. The API 900 may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof.

Figure 9:
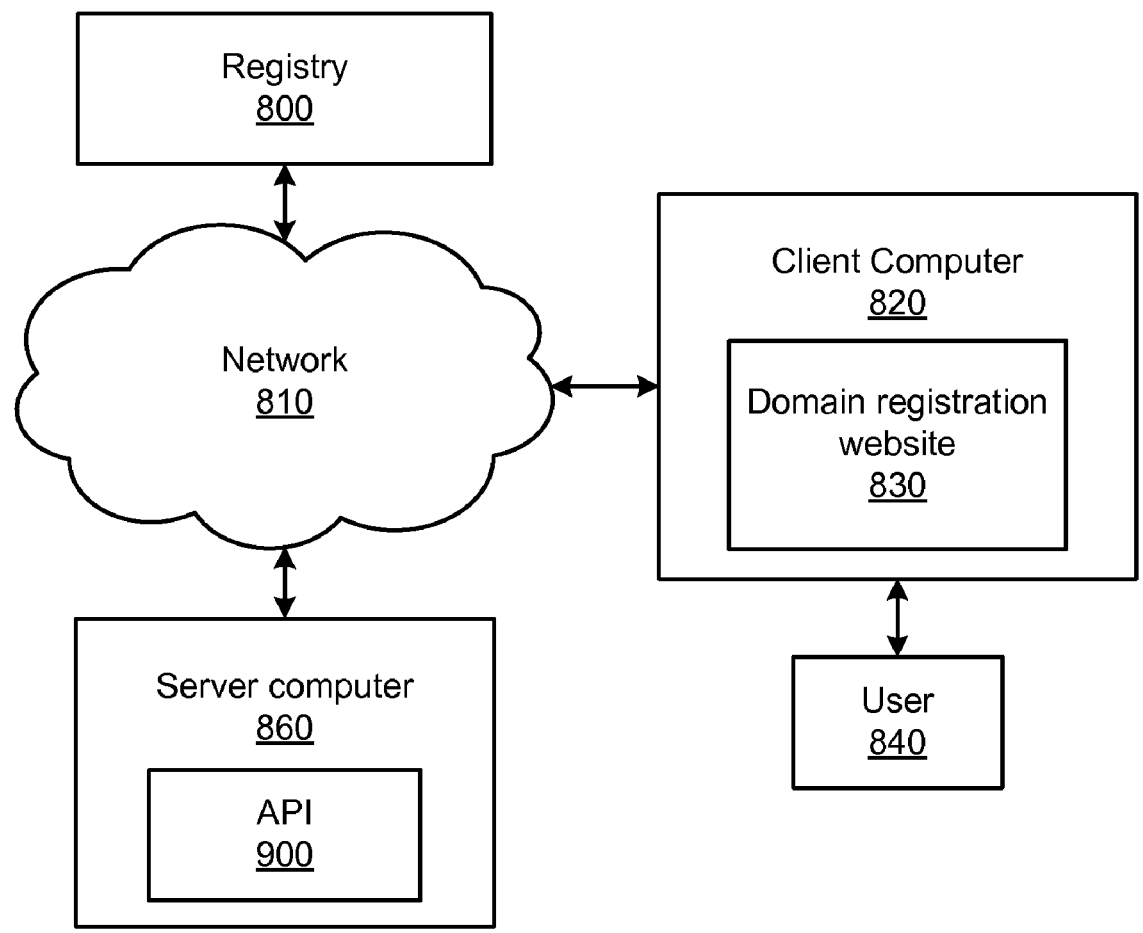
FIG. 9 illustrates a possible embodiment of tools that may be used to enable preferred domain positioning on a registration website.

FIG. 9 illustrates a computing environment in which the described API 900 may operate. The illustrated embodiment shows a network 810 communicatively coupling a registry 800, a server computer 860 on which the API 900 may run, and a client computer 820, through which a user 840 may access a domain registration website 830. With the illustrated embodiment, any individual or entity offering domains for registration may enable preferred domain positioning on a registration website 830 by providing access to the described API 900 via a network 810.

Figure 10:
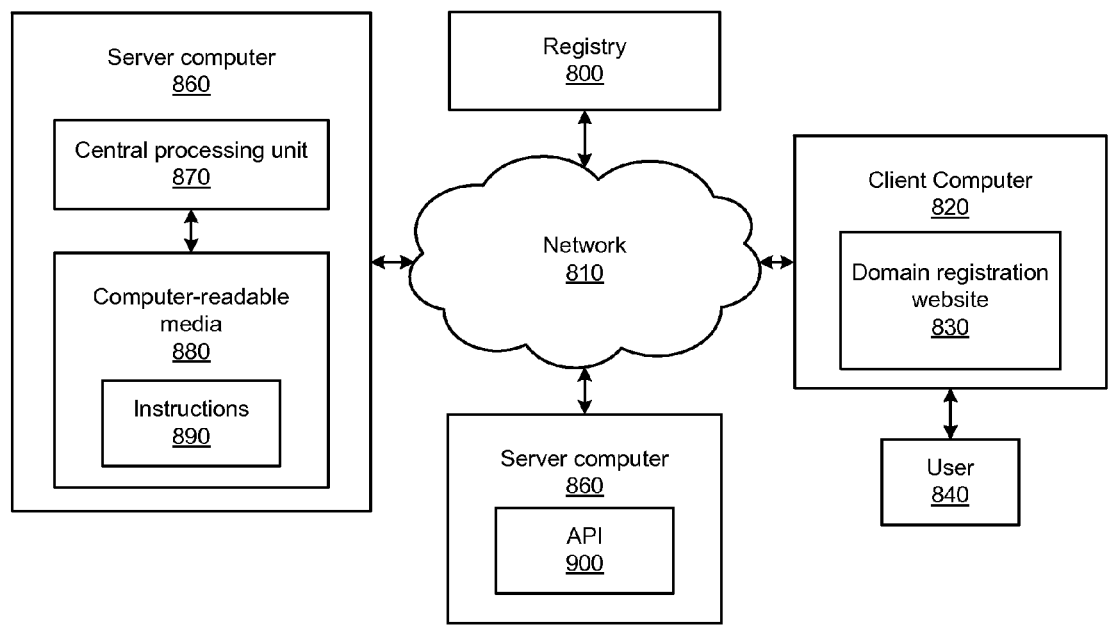
FIG. 10 illustrates a possible embodiment of tools that may be used to enable preferred domain positioning on a registration website.

FIG. 10 illustrates a more detailed, distributed system that may be used to enable preferred domain positioning on a registration website 830. This figure illustrates the above-described API 900 and computer-readable media 880 operating in the same computing environment. The illustrated embodiment is silent as to the entity operating the server computers 860 on which the API 900 and computer-readable media 880 operate. Thus, any individual or entity providing a network 810-coupled server computer 860 may practice the disclosed inventions.

Providing a Preferred Placement Service for Domain Registration Websites

Figure 11:
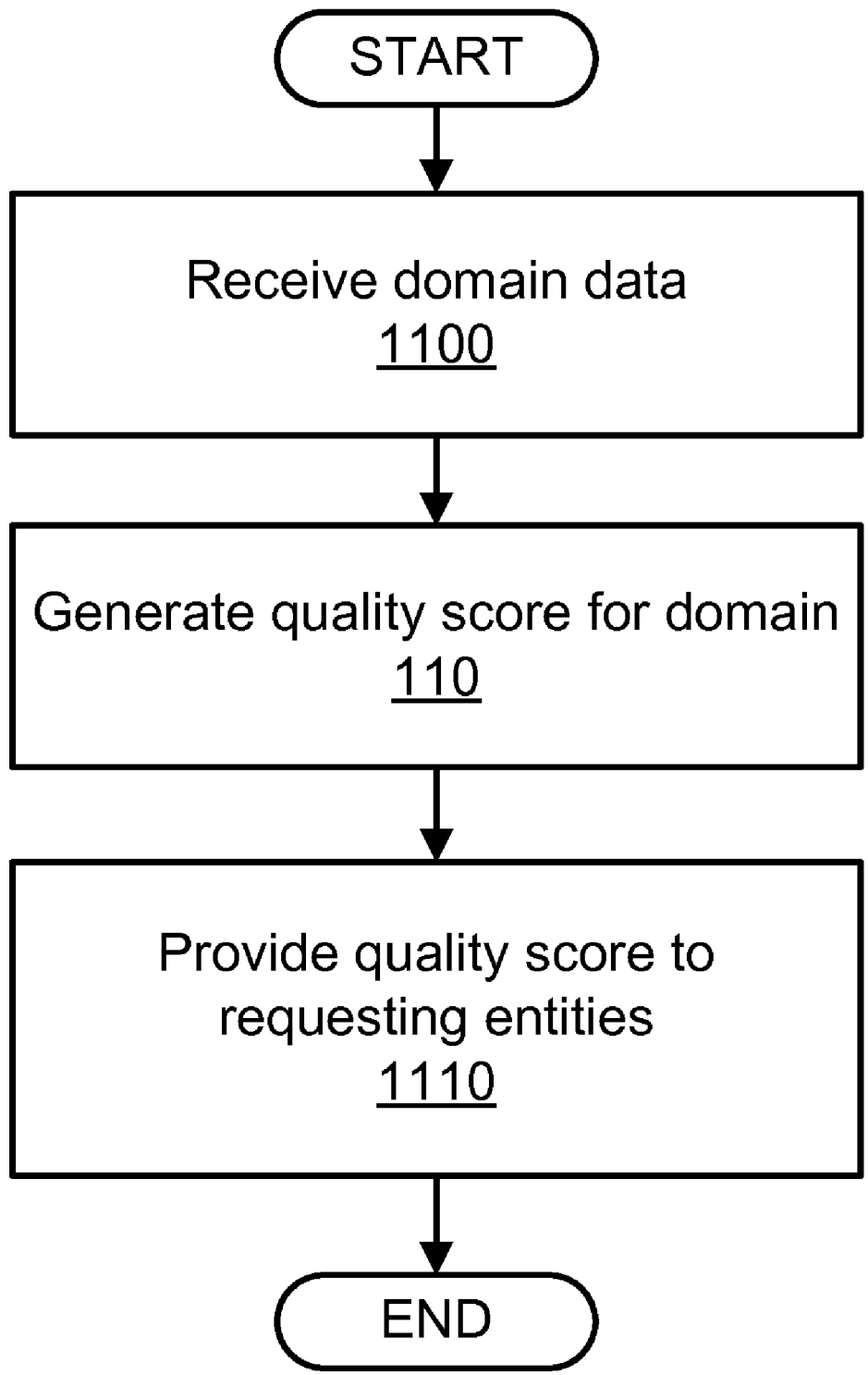
FIG. 11 is a flow diagram illustrating a possible embodiment of a method for determining preferred domain positioning on a registration website.

FIG. 11 illustrates an embodiment of a method for providing a preferred placement service for domain registration websites. This illustrated embodiment enables providing a quality score (and/or preferred placement) generation service to third-parties. Accordingly, as a non-limiting example, domain registrars who do not have the requisite technical systems and/or software may make a service request upon an entity practicing the below-described embodiments, which may, as a non-limiting example, be performed by at least one microprocessor on at least one server computer communicatively coupled to a network and executing a plurality of instructions stored on at least one computer-readable media. The method may comprise the steps of receiving data from registrars regarding a domain administered by a registry (Step 1100), generating a quality score for the domain based upon the data (Step 120), and providing the quality score to requesting entities (Step 1110).

The data collected in Step 1100 may comprise any data regarding the subject domain including, but not limited to, data indicating a price, a performance, a market share, and/or a customer desirability of the domain. Such data may further comprise, as a non-exclusive list, and data indicating: (1) domain Zone File availability; (2) registry-registrar connection quality; (3) quality of registry customer or technical support provided to registrars; (4) the existence of domain registration requirements implemented by the registry that may limit the pool of available domain registrants; (5) costs and fees charged to the registrar by the registry for domain registration (for both new and renewal registrations); (6) projected domain growth in market; (7) the domain's percentage of new domain registrations; (8) the number of domains registered at a specific registrar that include the subject domain; (9) WHOIS data availability and quality (i.e., contact data integrity and validity); (10) domain registry thickness (i.e., is the domain administered by a thick or thin registry?); (11) frequency in which domains comprising the subject TLD are the subject of availability checks; (12) overall domain registry reliability and availability (e.g., uptime, command execution success/failure, and domain registration refund percentages); (13) domain registration period in years supported at the registry; (14) domain renewal rate; and (15) domain transfer support and ease (i.e., does the registry support simple, automated domain transfers? Or is it difficult to move domains between registrars?). The data also could comprise a total volume (i.e., number) of domain registrations in a specified timeframe (e.g., the number of domains registered by a domain registrar within a 30-day period), a number of domain registration years (DRYs), or a number of DRYs registered by a domain registrar within a 30-day period.

Such data may be received (Step 1100) by any method of receiving or collecting data known in the art or developed in the future. As a non-limiting example, data may be collected directly from domain registrars, domain registries, and/or domain resellers via secure or unsecure Internet connections. Alternatively, data could be received from one or more third-parties having access to such data. Data may be received (Step 1100) via any method of data transfer know in the art or developed in the future. Such data transfer methods can generally be classified in two categories: (1) "pull-based" data transfers where the receiver initiates a data transmission request; and (2) "push-based" data transfers where the sender initiates a data transmission request. Both types are expressly included in the embodiments illustrated herein, which also may include transparent data transfers over network file systems, explicit file transfers from dedicated file-transfer services like FTP or HTTP, distributed file transfers over peer-to-peer networks, file transfers over instant messaging systems, file transfers between computers and peripheral devices, and/or file transfers over direct modem or serial (null modem) links, such as XMODEM, YMODEM and ZMODEM. Data streaming technology also may be used to effectuate data transfer. A data stream may be, for example, a sequence of digitally encoded coherent signals (packets of data) used to transmit or receive information that is in transmission. Any data transfer protocol known in the art or developed in the future may be used including, but not limited to those used with TCP/IP (e.g., FTAM, FTP, HTTP, RCP, SFTP, SCP, or FASTCopy), those used with UDP (e.g., TFTP, FSP, UFTP, or MFTP), those used with direct modem connections, HTTP streaming, Tubular Data Stream Protocol (TDSP), Stream Control Transmission Protocol (SCTP), and/or Real Time Streaming Protocol (RTSP).

A quality score for the domain may then be generated based upon the data (Step 120) as described in detail above. The quality score may then be provided to requesting entities (Step 1110). A requesting entity 1300 may comprise any individual or entity desiring a domain quality score for use in determining preferred domain placement on a domain registration website (e.g., a domain registry, a domain registrar, or a domain reseller). Step 1110 may be accomplished by transmitting the quality score as any electronic communication by any of the above-described data transmission methods including, but not limited to, a Hyper Text Transfer Protocol (HTTP), email message, Short Message Service (SMS) message (i.e., text message).

Figure 12:
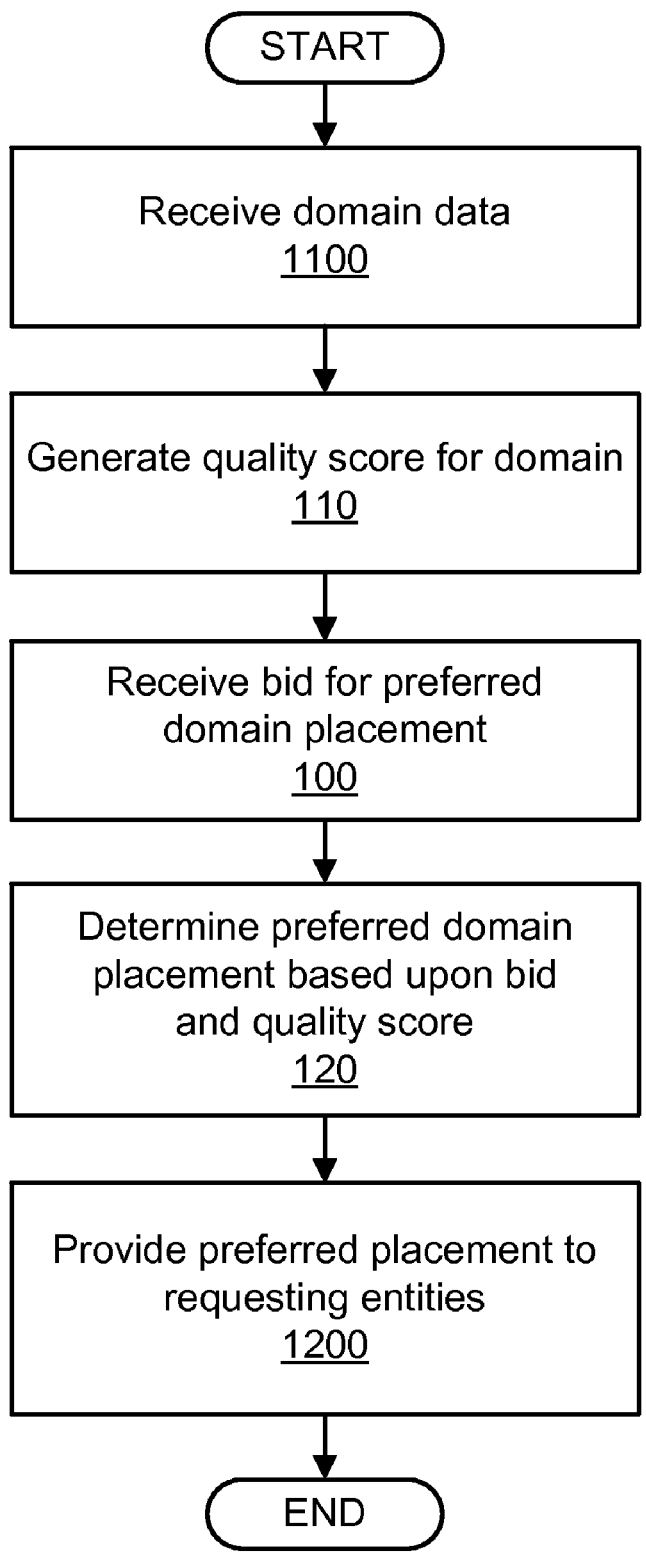
FIG. 12 is a flow diagram illustrating a possible embodiment of a method for determining preferred domain positioning on a registration website.

As illustrated in FIG. 12, the method may further comprise receiving a bid seeking a preferred placement on a domain registration website for a domain administered by the registry (Step 100) and determining the preferred placement (Step 120) based upon the bid and the quality score calculated in Step 110. The preferred placement may then be provided to the requesting entity 1300 (Step 1200) as described in detail with respect to Step 1110.

Tools Enabling a Preferred Placement Service for Domain Registration Websites

Figure 13:
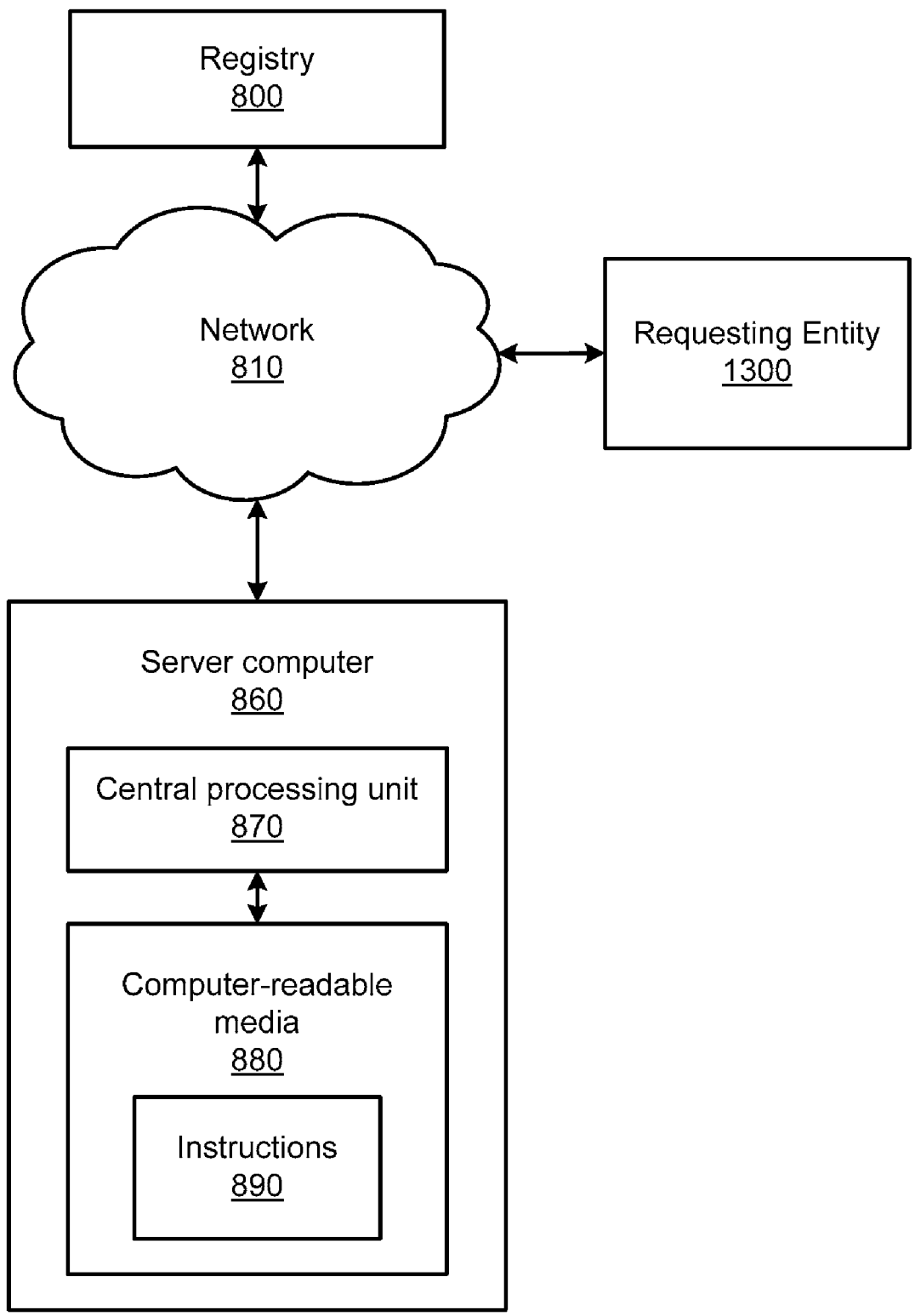
FIG. 13 illustrates a possible embodiment of tools that may be used to enable preferred domain positioning on a registration website.

The below-described embodiments provide software and hardware-based "placement determination engines" that may be used to implement the methods described herein. FIG. 13 illustrates a tool enabling a preferred placement service for domain registration. The illustrated embodiment may comprise computer-readable media 880 comprising a plurality of instructions 890 that, when executed by at least one server computer 860, may cause the server computer 860 (perhaps via its central processing unit(s) 870) to receive a request (perhaps from a requesting entity 1300 and comprising a bid and the domain) seeking such preferred placement (Step 100), generate a quality score for the domain (Step 110), determine the preferred placement based upon the bid and the quality score (Step 120), and transmit a response (comprising the preferred placement) to the request (Step 1200), perhaps to the requesting entity 1300.

Another tool enabling preferred domain positioning on a registration website may comprise an application programming interface (API) 900 running on at least one server computer 860 communicatively coupled to a network 810. The API 900 may comprise computer-readable code that, when executed by at least one server computer 860, causes the API 900 to receive a procedure call (i.e., function call) comprising a request (perhaps comprising a bid and said domain) seeking a preferred placement on a domain registration website for a domain administered by a registry, generate a quality score for the domain (Step 110), determine the preferred placement based upon the bid and the quality score (Step 120), and transmit a response (comprising the preferred placement) to the procedure call (Step 1200), perhaps to the requesting entity 1300.

FIG. 9 illustrates a computing environment in which the described API 900 may operate. The illustrated embodiment shows a network 810 communicatively coupling a registry 800, a server computer 860 on which the API 900 may run, and a client computer 820, through which a user 840 may access a domain registration website 830. With the illustrated embodiment, any individual or entity offering domains for registration may enable preferred domain positioning on a registration website 830 by providing access to the described API 900 via a network 810.

Figure 14:
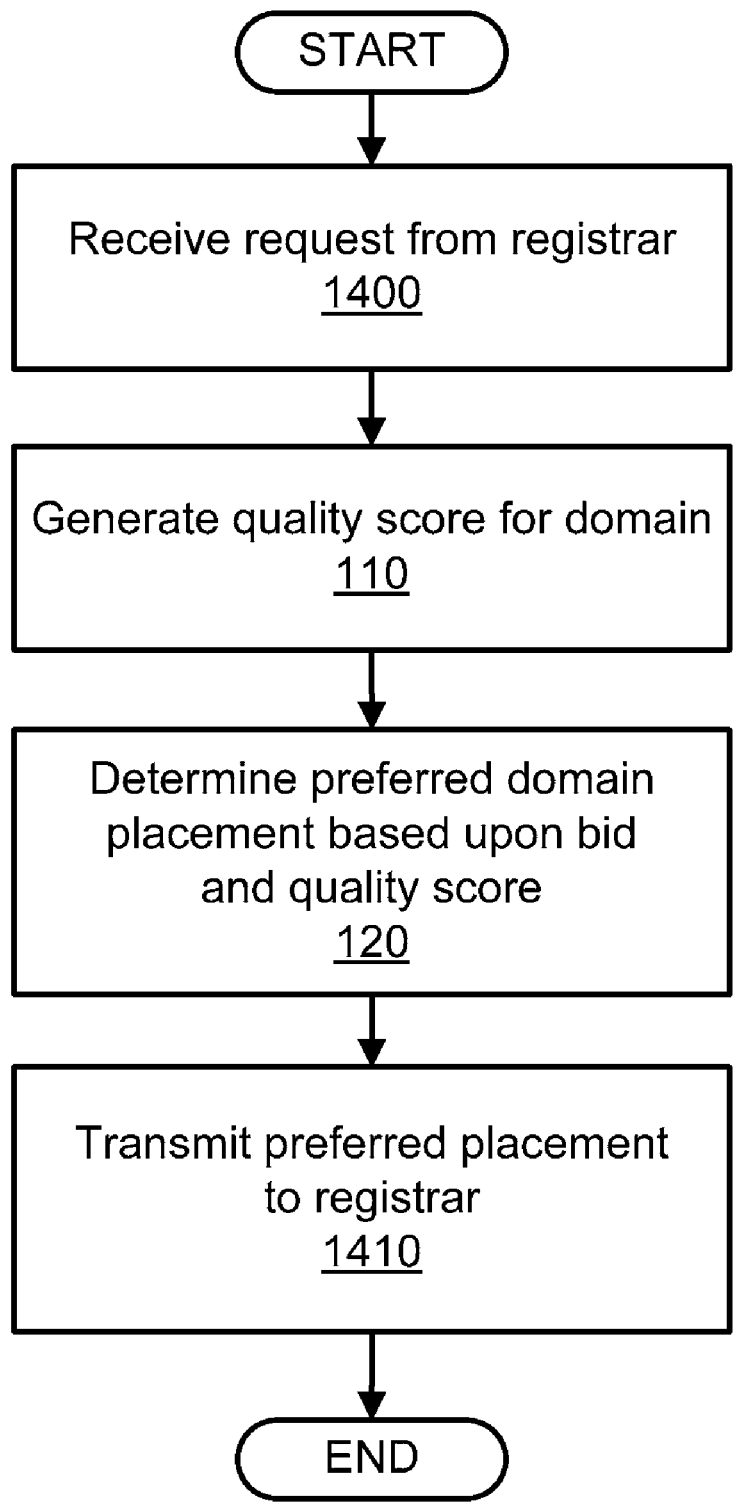
FIG. 14 is a flow diagram illustrating a possible embodiment of a method for determining preferred domain positioning on a registration website.

Methods Implementing a Preferred Placement Service for Domain Registration Websites FIG. 14 illustrates an embodiment of a method for providing a preferred placement service for domain registration websites that comprises receiving a request from a registrar, which may comprise a bid that the registrar had previously received from a registry seeking a preferred placement on a domain registration website for a domain administered by the registry (Step 1400). The request may be received as described in detail above with respect to Step 100. The method may further comprise generating a quality score for the domain (Step 110) and determining (based upon the bid and the quality score) a preferred placement for the domain (Step 120), which may be accomplished as described in detail above. The preferred placement may then be transmitted to the registrar (Step 1410) as described in detail above with respect to Steps 1110 and 1200.

Figure 15:
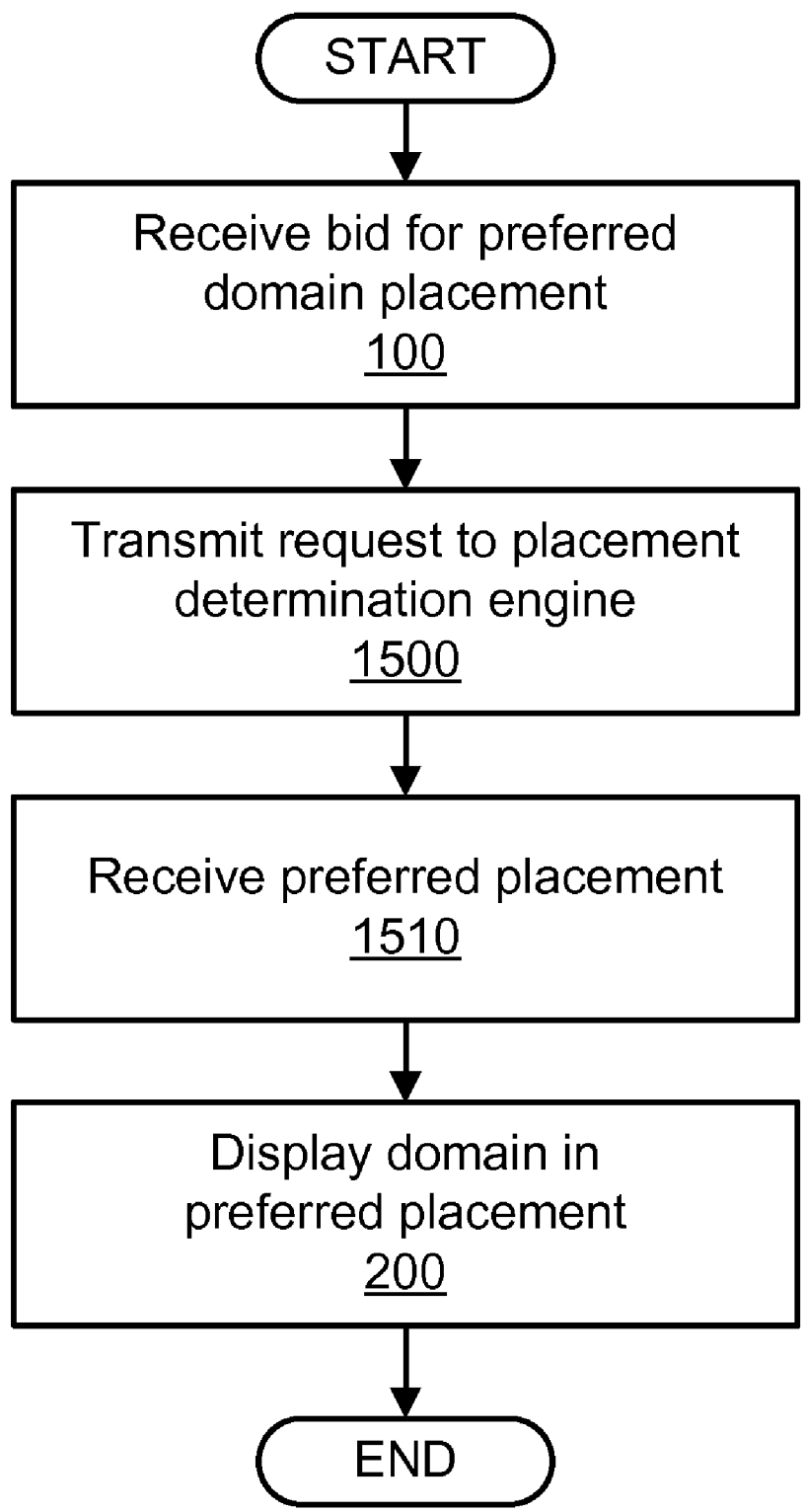
FIG. 15 is a flow diagram illustrating a possible embodiment of a method for determining preferred domain positioning on a registration website.

FIG. 15 illustrates an embodiment of a method for requesting and receiving a preferred placement for a domain on a registration website that comprises receiving a bid seeking a preferred placement on a domain registration website for a domain administered by the registry (Step 100), transmitting a request (that may comprising the bid and the domain received from the registry) for the preferred placement to a placement determination engine running on a server (Step 1500), receiving the preferred placement from the placement determination engine (wherein the preferred placement is based upon the bid and a quality score for the domain) (Step 1510), and displaying the domain on a domain registration website in the received preferred placement position (Step 200). Steps 1500 and 1510 may be accomplished by any method of data and/or file transmission described above. The placement determination engine may comprise any software and/or scripts, perhaps running on at least one server communicatively coupled to a network, operating to determine a preferred position of a domain on a domain registration website including, but not limited to software implementing the methods described herein. As a non-limiting example, the placement determination engine may comprise the computer readable-media and/or APIs described above.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A method, comprising:
   A) receiving, by at least one server computer communicatively coupled to a network, a request from a registrar, said request comprising a bid received by said registrar from a registry seeking a preferred placement on a domain registration website for a domain administered by said registry, said request further comprising said domain;
   B) generating, by at least one of said at least one server computer, a quality score for said domain;
   C) determining, by at least one of said at least one server computer, said preferred placement by:
      i) calculating a weighted bid index for said domain, wherein said weighted bid index is a function of said bid and said quality score; and
      ii) selecting said preferred placement based upon said weighted bid index; and
   D) transmitting to said registrar, by at least one of said at least one server computer, a response to said request, said response comprising said preferred placement.

2. The method of claim 1, wherein said domain comprises a top-level domain.

3. The method of claim 2, wherein said domain comprises a generic top-level domain.

4. The method of claim 2, wherein said domain comprises country code top-level domain.

5. The method of claim 1, wherein said domain comprises a second-level domain comprising a root name concatenated to a top-level domain administered by said registry.

6. The method of claim 5, wherein said second-level domain comprises a premium domain.

7. The method of claim 5, wherein said second-level domain comprises a suggested domain.

8. The method of claim 1, wherein said bid comprises an offer to pay a remuneration for said preferred placement.

9. The method of claim 8, wherein said remuneration comprises money to be paid on a cost-per-click, cost-per-impression, cost-per-acquisition, flat fee, or recurring fee basis.

10. The method of claim 1, wherein said bid comprises an electronic communication received by said at least one server.

11. The method of claim 1, wherein said bid is received via an application programming interface running on said at least one server and being accessible to said registry via said network.

12. The method of claim 1, wherein said registry comprises a domain registry, a domain registrar, or a domain reseller.

13. The method of claim 1, wherein said registry provides both domain registry and domain registrar services.

14. The method of claim 1, wherein said preferred placement comprises a location on said domain registration website more likely to attract the attention of a user of said domain registration website than another location.

15. The method of claim 1, wherein said preferred placement comprises a preferred placement within a vertical arrangement of a plurality of domains.

16. The method of claim 1, wherein said preferred placement comprises a preferred placement within a horizontal arrangement of domains.

17. The method of claim 1, wherein said preferred placement comprises a preferred placement within a drop-down box.

18. The method of claim 1, wherein said preferred placement comprises a top of a list of a plurality of domains.

19. The method of claim 1, wherein said preferred placement comprises a higher placement within a list of a plurality of domains than the placement of at least one other of said plurality of domains.

20. The method of claim 1, wherein said domain registration website is operated by a domain registry, a domain registrar, or a domain reseller.

21. The method of claim 1, wherein said quality score indicates a relative value of said domain when compared to a plurality of other domains.

22. The method of claim 1, wherein said quality score is a function of a price, a performance, or a market share of said domain.

23. The method of claim 1, wherein said quality score comprises a volume of domain registrations.

24. The method of claim 23, wherein said volume of domain registrations comprises a number of domains registered by a single registrar, a number of domains registered by a plurality of registrars, a number of domains registered by a single registrar within a 30-day period, a number of domains registered by a plurality of registrars within a 30-day period, a number of domain registration years, a number of domain registration years registered by a single registrar within a 30-day period, or a number of domain registration years registered by a plurality of registrars within a 30-day period.

25. The method of claim 1, wherein said weighted bid index is calculated according to the following formula: said weighted bid index=(a volume of domain registrations registered by a registrar within a 30-day period)*(a financial value of said bid+a predetermined financial credit).

26. A method, comprising:
   A) receiving, by a first at least one server computer communicatively coupled to a network, a bid from a registry seeking a preferred placement on a domain registration website for a domain administered by said registry;
   B) transmitting, by at least one of said first at least one server computer, a request for said preferred placement to a placement determination engine running on a second at least one server computer communicatively coupled to said network, said request comprising said bid and said domain;

C) receiving, by at least one of said first at least one server computer, said preferred placement from said placement determination engine, said preferred placement having been determined by said placement determination engine by:
  i) calculating a weighted bid index for said domain, wherein said weighted bid index is a function of said bid and a quality score for said domain; and
  ii) selecting said preferred placement based upon said weighted bid index; and D) displaying, by at least one of said first at least one server computer, said domain on said domain registration website in said preferred placement.

27. The method of claim 26, wherein said domain comprises a top-level domain.

28. The method of claim 27, wherein said domain comprises a generic top-level domain.

29. The method of claim 27, wherein said domain comprises country code top-level domain.

30. The method of claim 26, wherein said domain comprises a second-level domain comprising a root name concatenated to a top-level domain administered by said registry.

31. The method of claim 30, wherein said second-level domain comprises a premium domain.

32. The method of claim 30, wherein said second-level domain comprises a suggested domain.

33. The method of claim 26, wherein said bid comprises an offer to pay a remuneration for said preferred placement.

34. The method of claim 33, wherein said remuneration comprises money to be paid on a cost-per-click, cost-per-impression, cost-per-acquisition, flat fee, or recurring fee basis.

35. The method of claim 26, wherein said bid comprises an electronic communication received by said at least one server.

36. The method of claim 26, wherein said bid is received via an application programming interface running on said at least one server and being accessible to said registry via said network.

37. The method of claim 26, wherein said registry comprises a domain registry, a domain registrar, or a domain reseller.

38. The method of claim 26, wherein said registry provides both domain registry and domain registrar services.

39. The method of claim 26, wherein said preferred placement comprises a location on said domain registration website more likely to attract the attention of a user of said domain registration website than another location.

40. The method of claim 26, wherein said preferred placement comprises a preferred placement within a vertical arrangement of a plurality of domains.

41. The method of claim 26, wherein said preferred placement comprises a preferred placement within a horizontal arrangement of domains.

42. The method of claim 26, wherein said preferred placement comprises a preferred placement within a drop-down box.

43. The method of claim 26, wherein said preferred placement comprises a top of a list of a plurality of domains.

44. The method of claim 26, wherein said preferred placement comprises a higher placement within a list of a plurality of domains than the placement of at least one other of said plurality of domains.

45. The method of claim 26, wherein said domain registration website is operated by a domain registry, a domain registrar, or a domain reseller.

46. The method of claim 26, wherein said placement determination engine is operated by a domain registrar, a domain registry, or a domain reseller.

47. The method of claim 26, wherein said placement determination engine further comprises an applications programming interface running on at least one of said second at least one server and being accessible via said network.

48. The method of claim 26, wherein said quality score indicates a relative value of said domain when compared to a plurality of other domains.

49. The method of claim 26, wherein said quality score is a function of a price, a performance, or a market share of said domain.

50. The method of claim 26, wherein said quality score comprises a volume of domain registrations.

51. The method of claim 50, wherein said volume of domain registrations comprises a number of domains registered by a single registrar, a number of domains registered by a plurality of registrars, a number of domains registered by a single registrar within a 30-day period, a number of domains registered by a plurality of registrars within a 30-day period, a number of domain registration years, a number of domain registration years registered by a single registrar within a 30-day period, or a number of domain registration years registered by a plurality of registrars within a 30-day period.

52. The method of claim 26, wherein said weighted bid index is calculated according to the following formula: said weighted bid index=(a volume of domain registrations registered by a registrar within a 30-day period)*(a financial value of said bid+a predetermined financial credit).

* * * * *